Oct. 17, 1972　　　TAKEO NISHIMURA　　　3,699,011
METHOD OF PRODUCING THIN FILM INTEGRATED CIRCUITS
Filed Oct. 16, 1968　　　　　　　　　　　3 Sheets-Sheet 1
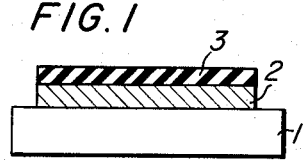
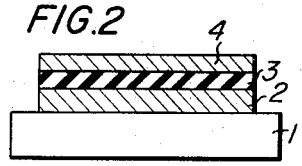
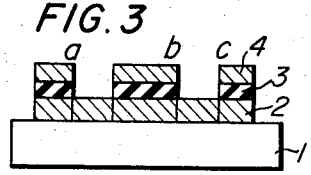
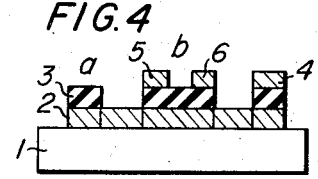
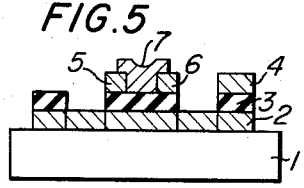
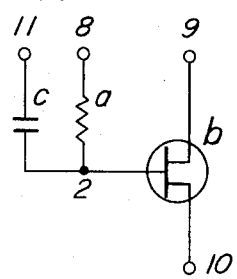
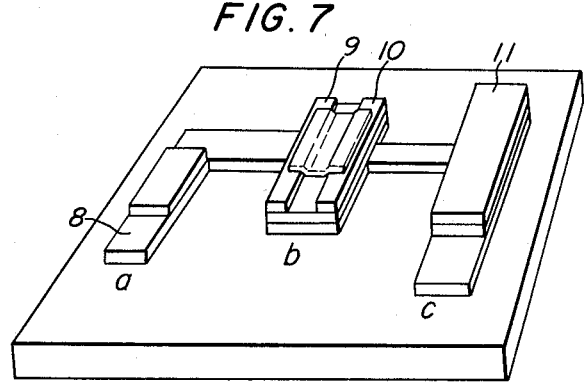
INVENTOR
TAKEO NISHIMURA
BY Craig & Antonelli
ATTORNEYS Oct. 17, 1972  TAKEO NISHIMURA  3,699,011
METHOD OF PRODUCING THIN FILM INTEGRATED CIRCUITS
Filed Oct. 16, 1968  3 Sheets-Sheet 3
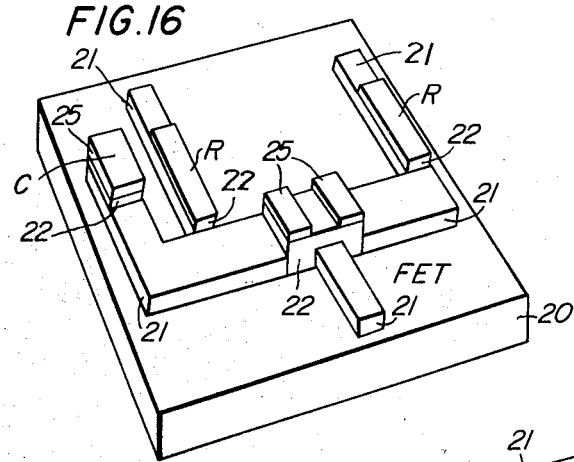
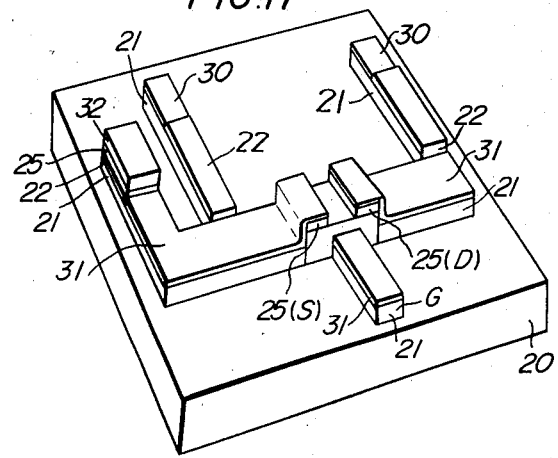
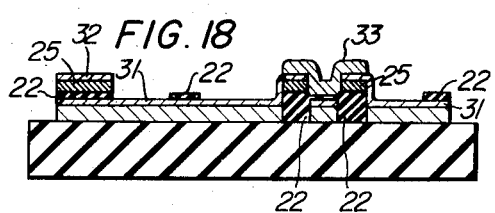
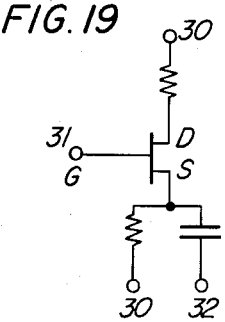
INVENTOR
TAKEO NISHIMURA
BY
ATTORNEYS United States Patent Office 3,699,011
Patented Oct. 17, 1972

3,699,011
METHOD OF PRODUCING THIN FILM
INTEGRATED CIRCUITS
Takeo Nishimura, Tokyo, Japan, assignor to Hitachi,
Ltd., Tokyo, Japan
Continuation-in-part of application Ser. No. 533,015,
Mar. 9, 1966. This application Oct. 16, 1968,
Ser. No. 768,089
Claims priority, application Japan, Mar. 18, 1965,
40/15,329
Int. Cl. C23b 5/48; C23f 17/00; H02b 1/04
U.S. Cl. 204—15
8 Claims

ABSTRACT OF THE DISCLOSURE

A method of producing thin film integrated circuits including thin film passive and active elements, which comprises the steps of depositing an anodizable metal on one surface of an insulating substrate, anodic oxidizing the surface portion of the deposited anodizable metal into its oxide layer of a desired sheet resistivity, depositing a conducting metal over the oxide layer, etching the anodizable metal, the oxide layer and the conducting metal in a desired pattern to obtain thin film passive elements such as a resistor and a capacitor, and depositing a semiconductor material to cover two metal layers spaced from each other existing on the oxide layer to obtain a thin film active element.

CROSS-REFERENCE TO RELATED APPLICATION

The present application is a continuation-in-part of my copending United States patent application Ser. No. 533,015, filed on Mar. 9, 1966 and now Pat. No. 3,423,821.

BACKGROUND OF THE INVENTION

The present invention relates to a method of producing thin film integrated circuits and more particularly to a method of producing thin film integrated circuits by forming on an insulator substrate a multiple circuit including "active circuit element" and "passive circuit element" are means of a thin film technique.

In the field of the semiconductor industry, the terms "active circuit element" and "passive circuit element" are generally used to mean an impedance network which operates as a current generator and an impedance network which does not operate as a current generator, respectively.

Examples of the active circuit element include photocells, transistors and diodes, while those of the passive circuit elements include resistors, capacitors and coils.

Miniaturization of electronic circuitry is a general tendency in recent years, and development researches are now being conducted energetically for the formation of circuitry on the plane of the same substrate, utilizing the thin film technique. Such a planar formation of circuitry is generally achieved by two methods. One of them is a method of producing circuits by means of the thin film technique in which conductive portions, resistors, capacitors and the like are produced on an insulator substrate, such as ceramic or glass, by means of printing or vacuum evaporation and the other is a hybrid integrated circuit method in which transistors, diodes and the like are built in a semiconductor crystal substrate and the other components (passive circuit elements) are produced on the same substrate by means of evaporation or other suitable means.

The present invention is concerned with the former method, that is, the so-called thin film integrated circuit method, which comprises forming active circuit elements and passive circuit elements on an insulator substrate and connecting said circuit elements to each other by means of evaporation or other means in accordance with a predetermined electronic circuit, to thereby form a desired electronic circuit.

In the formation of an electronic circuit in the form of a thin film, heretofore, it has been the practice to place on a substrate active circuit elements, such as transistors and diodes, which were prepared separately beforehand; therefore, there were drawbacks that the circuit obtained involved a wasteful space of a height corresponding to that of these component elements, and was expensive and unreliable. In addition, while it was possible to produce the aforementioned passive circuit elements, such as resistors and capacitors, by evaporation, these elements must have been produced on a substrate individually, each by a separate evaporation process according to the kind thereof, at their respective positions in a desired electronic circuit. This has rendered the production process complicated and hence added to the cost of production, and it is for this reason that the thin film circuit method has not been employed for practical application, although it has the advantage that the thin film circuit produced thereby is precise and has a high reliability.

SUMMARY OF THE INVENTION

An object of the present invention is to provide a novel method of producing thin film integrated circuits by a simple process.

Another object of the invention is to provide a method of producing novel passive circuit elements in the thin film integrated circuits.

A further object of the invention is to provide a method of producing novel active circuit elements in the thin film integrated circuits.

According to the features of the present invention, three layers are formed on an insulator substrate with an insulating layer present in the middle, by first depositing a layer of a predetermined thickness of an anodizable metal, such as tantalum, titanium and the like, on the insulating substrate, then anodic oxidizing the whole surface of said first deposited metal layer to a predetermined thickness to form a second layer of an oxide thereof so that the remaining anodizable metal layer may have a predetermined sheet resistivity and thereafter depositing on said second insulating layer a thin film of metal, such as aluminum and copper having a high conductivity to form a third layer.

Using this as a starting material, active circuit elements and passive circuit elements are provided on the insulating substrate and connected to each other. Such connections are conveniently effected by making use of the first layer. Of the passive circuit elements, resistance elements are provided by the use of the first layer. The remaining layer of the anodizable material is advantageously used as a material for resistance due to its high resistivity. The resistance value of the resistance element may be controlled by the thickness of the oxide resulting from the anodizing. A capacitive element is provided by making use of the oxide of the first layer which is formed between the first layer and the third layer and is serving as a dielectric layer. A transistor may be provided, for example, by dividing the third layer into two portions thereof and then depositing thereon a semiconductor material, such as CdS or CdSe, to thereby produce a field effect transistor. In this instance, a source electrode and a drain electrode are formed by making use of the third layer, while a gate electrode is formed by making use of the first layer. In forming a thin film integrated circuit having these active circuit elements and passive circuit elements on an insulator substrate in accordance with the present invention, portions of the three layers, that is, anodizable lower metal layer, oxide insulating thin film layer and the upper metal thin film layer formed in turn on said substrate are selectively removed to provide a plurality of thin film passive elements and a semiconductor material is deposited between parts of the upper metal thin film layer to form thin film active elements, and a portion or the whole of said lower thin film metal is used as a common conductive portion, whereby a complete thin film integrated circuit is formed.

BRIEF DESCRIPTION OF THE DRAWING

FIGS. 1 through 5 are process diagrams showing each step of a production method embodying the present invention.

FIG. 6 is an equivalent circuit diagram of FIG. 5.

FIG. 7 is a perspective view of FIG. 5.

FIGS. 8 through 18 are process diagrams showing each step of the production of another embodiment of the present invention.

FIG. 19 is an equivalent circuit diagram of FIG. 18.

DESCRIPTION OF THE PREFERRED EMBODIMENTS

Figure 8:
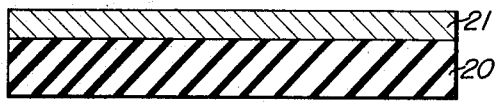

Referring now to FIG. 1, reference numeral 1 indicates an insulating substrate which is generally made of ceramic or boron silicate glass. The material of the insulator substrate is not restricted only to those mentioned above, but single crystal substrates, such as sapphire, glazed ceramic or devitroceramic may also be used. On said insulator substrate, an anodizable metal 2, such as Ta, Nb, Zr, Ti, Al, etc., is deposited. The deposition may be effected by evaporation or cathode sputtering method in a predetermined thickness to form a required sheet resistivity of the metal layer 2 and an oxide insulator layer 3. A variety of solutions is generally used for the anodizing and as an example, one form thereof is a mixture of oxalic acid, water and ethylene glycol at the ratio of 1:2:3. Citric acid, phosphoric acid or dilute nitric acid may also be used. The thickness of the oxide layer 3 is a function of the anodizing solution, the voltage, current and time used for the anodizing. Therefore, a desired thickness of the metal layer 2 can be obtained by controlling these factors. Thereafter, a metal having a good conductivity, such as aluminum, is deposited on the insulator layer 3 by evaporation to thereby form a metal conductor layer 4 as shown in FIG. 2.

In the manner described above, three layers consisting of a metal as first layer, an insulator as second layer and a metal as third layer are formed on the insulator substrate 1. Upon completion of this, the third and second layers are removed partially by means of the photoetching technique, which is widely employed in the semiconductor industry, so as to form a plurality of thin film elements as indicated by a, b and c in FIG. 3. The dimensions and areas of each of the thin film elements thus formed must be selected in accordance with the desired elementary structure. The thin film elements are then fabricated individually according to the objects which they serve respectively. For instance, a resistance which is to be formed with the element a can be provided by first removing the uppermost metallic thin film and then selectively removing the insulator layer and the first metal layer so that the resultant element be shaped as shown in FIG. 7. The element b is the portion where an active circuit element is to be formed, the width thereof being shown wider only for the purpose of illustration. This circuit element is provided by removing the central portion of the upper metal 4 with two conductive portions 5, 6 remaining as shown in FIG. 4 and then a semiconductor crystal, e.g., a polycrystalline or a mono-crystalline CdSe or others, is deposited across said conductive portions 5 and 6 by means of evaporation or other technique, whereupon a field effect transistor is produced as shown in FIG. 5, in which the first metal thin film layer 2 serves as a gate electrode and the third layer metallic conductors 5 and 6 as a drain electrode and a source electrode, respectively. The capacitor as it is may be used as condenser without necessity for further treatment. The constitutional elements obtained in the manner described above, in which the thin film layer 2 serves as a common conductive portion, forms a functional circuit whose equivalent circuit is shown in FIG. 6. A perspective view of the completed circuit of FIG. 5 is shown in FIG. 7, in which reference numerals 8, 9, 10 and 11, respectively, indicate lead terminals drawn out from the resistance a, drain 5 and source 6 of the field effect transistor b and the capacitor c.

Next, another embodiment of this invention will be explained with reference to FIGS. 8 to 19.

Figure 9:
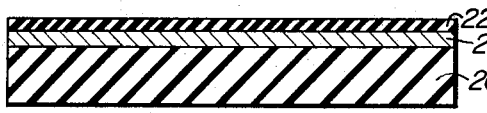
Figure 10:
Figure 11:
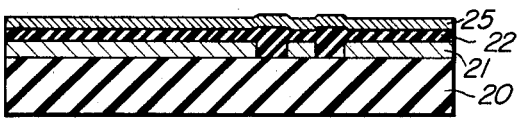
Figure 12:
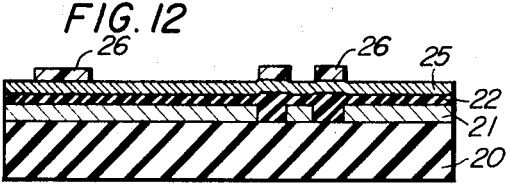
Figure 13:
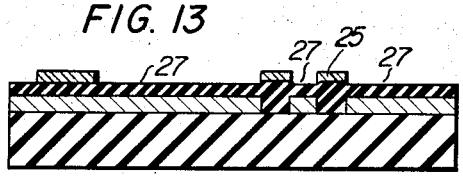
Figure 14:
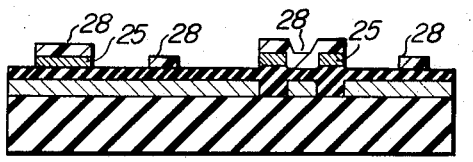
Figure 15:
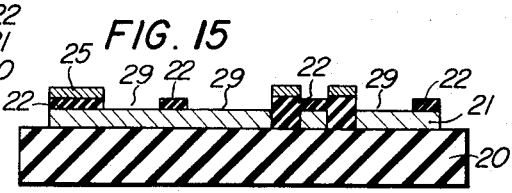

In FIG. 8, the numeral 20 is an insulator serving as a substrate for the thin film circuit. A tantalum layer 21 is deposited by sputtering on the whole surface of the substrate. The tantalum layer 21 is fully anodic oxidized at the surface portion thereof to give a prescribed surface resistance to the taantalum layer 21 and to form a tantalum oxide layer (insulator) 22 on the tantalum layer 21 as shown in FIG. 9. A photosensitive and chemical-proof resin (photoresist) film 23 is deposited on the surface of the tantalum oxide layer 22. The resin film is partially exposed to light and developed. By this treatment a part of the photoresist film is removed in the regions 24 as shown in FIG. 10. Further anodic oxidation of the tantalum layer is carried out to change the underneath portions of the tantalum layer below the openings 24 to tantalum oxide to reach the substrate as shown in FIG. 11. After removal of the photoresist film 23 on the tantalum oxide layer 22 by using appropriate chemicals, a conducting metal 25 such as aluminum is evaporated in vacuum on the tantalum oxide film 22. By coating a photoresist film thereon, exposing it to light partially and thereafter developing, a photoresist film 26 is formed partially on the surface of the conducting metal layer 25 as shown in FIG. 12. The portion of the aluminum layer not covered with the photoresist film is removed by a mixed solution of phosphoric acid and nitric acid. The regions 27 in FIG. 13 show the state after the conducting metal 25 is thus removed. The conducting metal layer 25 remaining on the oxide layer 22 can be utilized as one of the electrodes of a capacitor and the source and drain electrodes of a thin film field effect transistor. The assembly thus treated is coated with a photoresist film and selectively exposed to light and developed. A photoresist film 28 is thus provided to expose partially the tantalum oxide layer (in FIG. 14). The tantalum oxide layer is thereafter removed partially by caustic soda solution, as shown in FIG. 15 and the regions 29 show the portions removed by etching. Next, the entire surface is again coated with photoresist and exposed to light selectively and developed to form a photoresist layer. This photoresist layer is formed on the surfaces of the thin film circuit elements such as a field effect transistor, a capacitor, a resistor and a conductor. Thereafter the assembly is dipped in a mixed solution of hydrofluoric acid and nitric acid to etch partially the uncovered portion of the tantalum layer 21.

FIG. 16 is a perspective view of the element thus obtained, in which R, C and FET show the resistor, the capacitor and the field effect transistor elements, respectively. Next, conductive metal is again deposited on predetermined positions of the thin film circuit, as shown in FIG. 17. In this figure, 30, 31 and 32 represent newly-deposited metal layers, 30 being terminals of the resistive elements, 31 being electrode terminals of the FET, and 32 being the electrode terminal of the capacitor. If the conductor connecting these circuit elements is made by the tantalum layer itself, it represents a high resistance and hence a large loss. Therefore, the general procedure is to deposit new metal such as aluminum on the conducting portions to decrease the resistance. In order to form a thin film field effect transistor a semiconductor material such as CdS as shown by 33 in FIG. 18 is deposited to cover the portions of the source and drain electrodes 25. By this treatment a thin film field effect transistor is formed. In place of the partial evaporation of the semiconductor material, it is possible to deposit the semiconductor material to the whole surface of the substrate and to partially etch the deposited semiconductor material as forming a thin film field effect transistor as represented by 33 in FIG. 18.

In FIG. 18, S, G and D represent the source, the gate and the drain, respectively. A circuit as shown in FIG. 19 is formed in the thin film circuit configuration.

Although the foregoing description has been made with reference to a simple circuit as an example of a functional circuit, it is to be understood that the method of this invention may also be applied to the production of more complicated functional circuits comprising a plurality of thin film active elements and thin film passive elements incorporated therein.

Furthermore, as shown in FIG. 17, although the thin film passive elements are connected to the source and drain of the thin film field effect transistor, these passive elements, such as a resistor and a capacitor, may as well be connected to the gate. It is also possible to form a plurality of thin film active elements on the insulating substrate.

Therefore, this invention is characterized by the facts that (1) after determinations of the sheet resistivity of the anodizable metal and the thickness and the dielectric strength of the oxide layer formed on the surface of the anodizable metal in desired values by the anodic oxidation method, the resistors, the condensers or combinations thereof can be formed by the etching method, and (2) at least one of the thin film active elements is formed by evaporation method (of the semiconductor material, wherein thin film integrated circuit constructed with thin film passive and active circuit elements).

Owing to the construction as described above, the present invention is advantageous over the prior art method of producing a thin film integrated circuit in a number of aspects. Namely, according to the conventional methods, a passive circuit element and an active circuit element were produced separately, and thereafter the active circuit element was mounted. In addition, the elements were made of different materials and a number of evaporating steps were required whereas according to the method of the present invention, since the essential portion of an active circuit element and a major portion of a passive circuit element are formed of the same material simultaneously, the number of evaporating steps can be decreased remarkably, thus making it possible to reduce production costs, and as the number of interconnections can be decreased, a high reliability of circuits can be accomplished. Furthermore, the present invention has made it possible for the first time to provide the component elements of a circuit all in the form of thin films and is hence greatly advantageous in view of the ultra-miniaturization, and the improvement of preciseness and characteristics of a circuit, which are the advantageous features of a thin film circuit. It is also to be noted that, as mentioned earlier, the electronic circuits according to this invention may be used for various types of electronic circuits, particularly for all digital and analog circuits using semiconductors, and further for a wide range of applications including those for communication and high frequencies.

I claim:

1. A method for fabricating a thin film integrated circuit having at least one active element and at least one passive element integrally combined with the active element, comprising the steps of:
    (a) depositing an anodizable metal on one surface of a substrate of an insulating material to form a first metal layer;
    (b) oxidizing the surface of the first metal layer to a predetermined extent in depth through anodic oxidation to obtain a layer of oxide of the anodizable metal so that the first metal layer exhibits a predetermined resistivity;
    (c) depositing a conductive metal on the oxide layer to form a second metal layer;
    (d) etching the first and second metal layers and the oxide layer in a desired pattern to obtain at least one thin film passive element and two separated portions of the second metal layers; and
    (e) depositing a semiconductor material on the oxide layer as to connect said two separated portions of the second metal layer to obtain a thin film active element.

2. A method for fabricating a thin film integrated circuit comprising at least one active element and at least one resistor integrally formed in combination with the active element, comprising the steps of:
    (a) depositing an anodizable metal on one surface of a substrate of an insulating material to form a first metal layer;
    (b) oxidizing the surface of the first metal layer to a predetermined extent in depth through anodic oxidation to obain a layer of oxide of the anodizable metal so that the first metal layer exhibits a predetermined resistivity;
    (c) depositing conductive metal on the oxide layers to form a second metal layer;
    (d) etching the first and second metal layer and the oxide layer such that the first metal layer is formed into at least two major portions and interconnecting portions therebetween, that the oxide layer substantially remains on said major portions of the first metal layer, and that the second metal layer remains on the oxide layer covering a first major portion of the first metal layer in at least two separated parts thereof, the second major portion serving as a resistance element;
    (e) depositing a layer of a predetermined thickness of conductive metal only on the exposed surface of the first metal layer, thereby forming means for interconnecting the thin film resistance element and the first metal layer, thereby forming means for interconnecting the thin film resistance element and the first main portion of the first metal layer; and
    (f) depositing a semiconductor material on the oxide layer to connect said two separated parts of the second metal layer remaining on the oxide layer, thereby obtaining a thin film field effect transistor wherein the first metal layer serves as the insulated gate electrode, the oxide layer serves as the insulator, the two parts of the second metal layer serve as the source and drain electrodes, respectively, and the deposited semiconductor material serves as the channel of the thin film field effect transistor.

3. A method for fabricating a thin film integrated circuit comprising at least one active element and at least one capacitor integrally formed in combination with the active element, comprising the steps of:
    (a) depositing an anodizable metal on one surface of a substrate of insulating material to form a first metal layer;
    (b) oxidizing the surface of the first metal layer to a predetermined extent in depth through anodic oxidation to obtain a layer of oxide of the anodizable metal so that the first metal layer exhibits a predetermined resistivity;
    (c) depositing a conductive metal on the oxide layer to form a second metal layer with a predetermined thickness;
    (d) etching said first and second metal layers and said oxide layer such that the first metal layer is formed into at least two major portions with interconnecting portions which substantially conductively and electrically connect said two main portions to each other, that a first major portion of the first metal layer is covered with the oxide layer on which two spaced parts of the second metal layer are provided, that the second major portion is covered with the oxide layer on which the second metal layer is provided, the assembly of the second major portion of the first metal layer, the oxide layer thereon and the second metal layer thereon serving as a thin film capacitor, and that the interconnecting portions of the first metal layer may be exposed by the removal of the oxide layer and the second metal layer therefrom;

(e) depositing a predetermined thickness of a conductive metal only on the exposed surface of the interconnecting portions of the first metal layer thereby forming means for interconnecting the first major portion of the first metal layer to the capacitor; and (f) depositing a semiconductor material on the oxide layer to connect said two spaced parts of the second metal layer existing on the oxide layer thereby producing a thin film field effect transistor wherein the first metal layer serves as the insulated gate electrode, the oxide layer serves as the insulator, the two spaced parts of the second metal layer serve as the source and drain electrodes, respectively, and the deposited semiconductor material serves as the channel of the thin film field effect transistor.

4. A method for fabricating a thin film integrated circuit comprising at least one active element and at least one capacitor integrally formed in combination with the active element, comprising the steps of:

(a) depositing an anodizable metal on one surface of a substrate of insulating material to form a first metal layer;

(b) oxidizing the surface of the first metal layer to a predetermined extent in depth through anodic oxidation to obtain an oxide layer of the anodizable metal so that the first metal layer exhibits a predetermined resistivity;

(c) further oxidizing a first major portion of the first metal layer so as to form three isolated parts thereof a first part of which serves as an insulated gate electrode of a thin film field effect transistor;

(d) depositing a conductive metal on the surface of the oxide layer to form a second metal layer;

(e) etching the first and the second metal layers and the oxide layer such that the first metal layer is formed into first and second major portions with an interconnecting part therebetween, that the oxide layer is left only on said first and second major portions of the first metal layer, and that said second metal layer is provided on the oxide layers covering the surfaces of the first and second major portions of the first metal layer and that the second metal layer covering over the first major portion of the first metal layer is separated into two spaced parts thereof;

(f) depositing a conductive metal layer on the exposed surface of the interconnecting part of the first metal layer to connect the two spaced portions of the second metal layer, respectively, and (g) depositing a semiconductor material on the oxide layer to connect between said two spaced parts of the second metal layer on the oxide layer thereby obtaining a thin film field effect transistor wherein the first part of the first metal layer serves as an insulated gate and the two spaced parts of the second metal layer serve as source and drain, respectively, and the deposited semiconductor material serves as the channel of the thin film field effect transistor.

5. A method according to claim 4, wherein an anodizable metal is selected from the group of aluminum, tantalum, titanium, niobium, iron, copper and silver.

6. A method according to claim 4, wherein a second metal layer is selected from the group of aluminum and copper.

7. A method according to claim 4 characterized by selecting the thickness of said anodizable metal deposited on the substrate surface so that said oxide layer formed therein has a desired thickness for the dielectric of the capacitor and field effect transistor to be formed and that the sheet resistivity of the remaining anodizable metal is at a desired value.

8. A method for fabricating a thin film integrated circuit having at least one active element and at least one passive element integrally combined with the active element, comprising the steps of:

(a) depositing an anodizable metal on one surface of a substrate of insulating material to form a first metal layer;

(b) oxidizing the surface of the first metal layer to a predetermined depth by means of anodic oxidation, to obtain a layer of the anodizable metal so that the first metal layer exhibits a predetermined resistivity;

(c) depositing conductive metal on said oxide layer to form a second metal layer so that a three-layer structure is produced, comprising the first metal layer, oxide layer and the second metal layer;

(d) etching said three-layer structure such that the first metal layer is divided into at least two major portions and a connecting portion, that a first one of said major portions is shaped to provide a predetermined value of the passive element, that a second one of the major portions is isolated by the oxide layer produced from the first and second anodic oxidations which is provided thereon with two separated parts of the second metal layer, that the upper surface of said connecting portion of the first metal layer is exposed and integrated to the first major portion and extended to near the isolated second major portion;

(e) depositing a semiconductor material on the oxide layer covering the second major portion to connect the two separated parts of the second metal layer, thus producing a thin film field effect transistor wherein said second major portion serves as the insulated gate electrode; said oxide layer serves as the insulated gate electrode; said oxide layer serves as the insulator; said two separated parts of the second metal layer serve as the source and drain electrodes, respectively; and the deposited semiconductor material serves as the channel of the thin film field effect transistor; and (f) depositing a conductive material only on the exposed surface of the connecting portion of the first metal layer and on the oxide layer covering the second major portion to make a connection to one of the two separated parts of the second metal layer.

References Cited

UNITED STATES PATENTS

| | | | |
|---|---|---|---|
| 3,138,744 | 6/1964 | Kilby | 317—101 |
| 3,217,209 | 11/1965 | Kinsella et al. | 317—101 |
| 3,256,588 | 6/1966 | Sikina et al. | 204—15 |
| 3,294,653 | 12/1966 | Keller et al. | 204—15 |
| 3,311,546 | 3/1967 | Berry et al. | 204—15 |
| 3,387,952 | 6/1968 | La Chapelle | 117—212 |

JOHN H. MACK, Primary Examiner

T. TUFARIELLO, Assistant Examiner

U.S. Cl. X.R.

29—571, 577, 589; 117—212; 174—68.5; 204—38: 317—101, 235